J. S. LITTELL.
EDUCATIONAL APPLIANCE.
APPLICATION FILED MAR. 16, 1906.
898,754.
Patented Sept. 15, 1908.
2 SHEETS—SHEET 1.
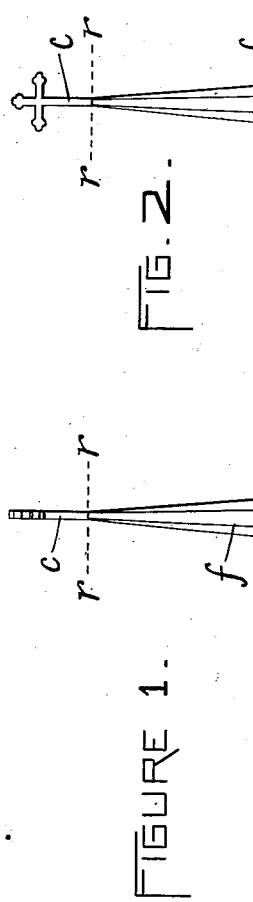
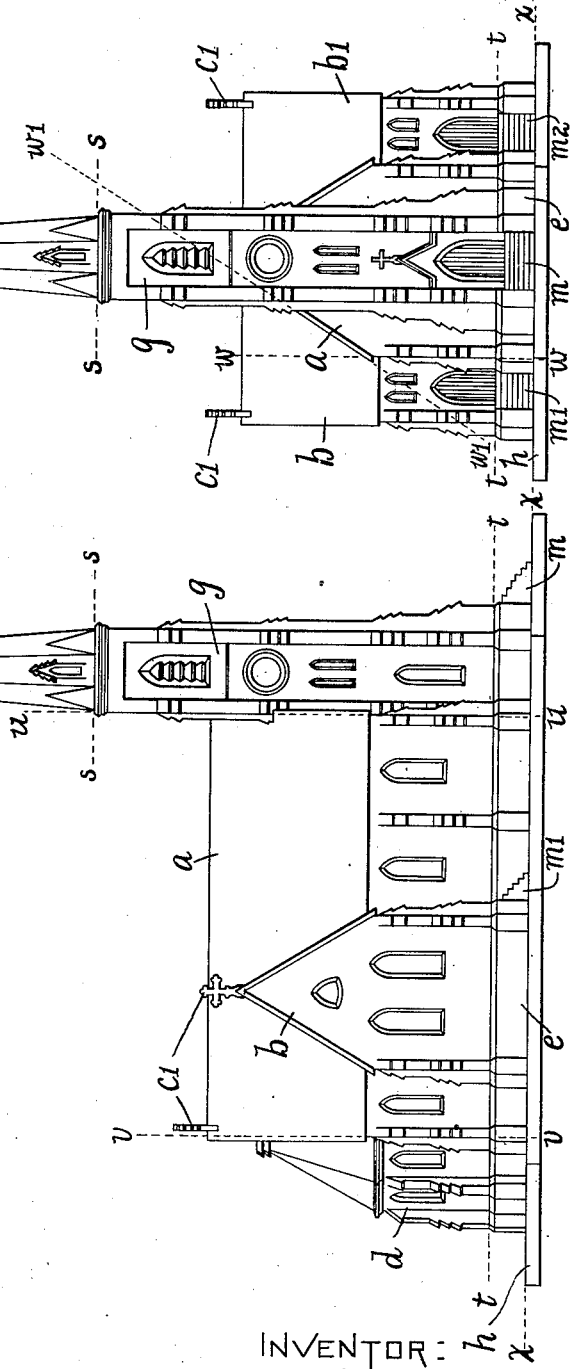
WITNESSES:
Albert C. Bill.
Lottie Wood.
INVENTOR:
John S. Littell.
By W. H. Cooley
ATTY.

J. S. LITTELL.
EDUCATIONAL APPLIANCE.
APPLICATION FILED MAR. 16, 1906.
898,754.
Patented Sept. 15, 1908.
2 SHEETS—SHEET 2.
FIG. 3.
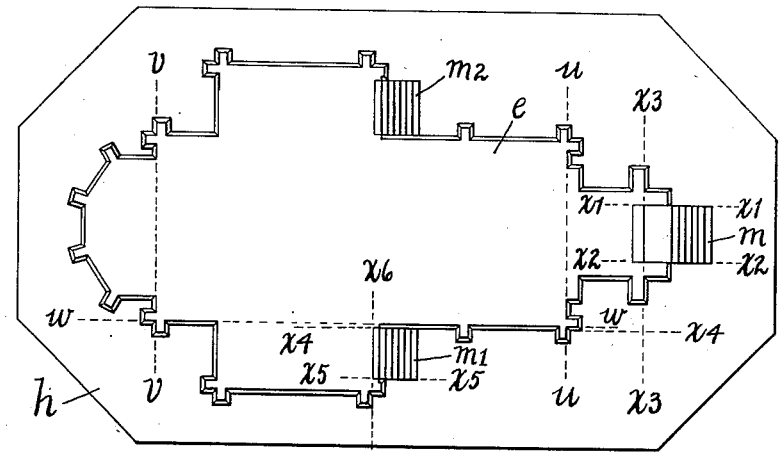
FIG. 4. FIG. 5. FIG. 6. FIG. 7.
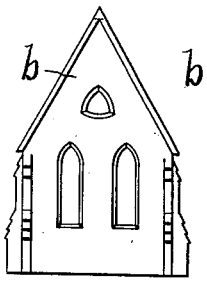 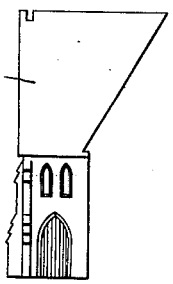 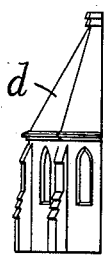 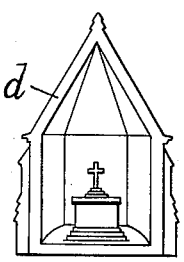
FIG. 8. FIG. 9. FIG. 10.
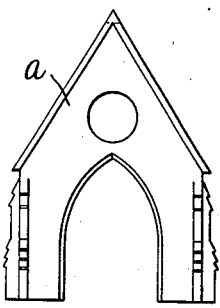 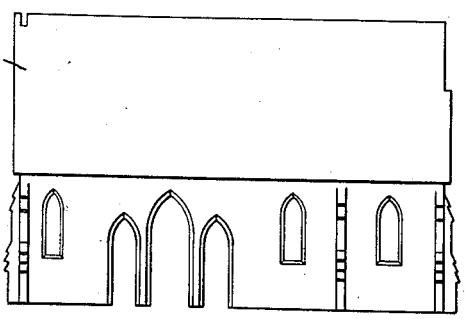 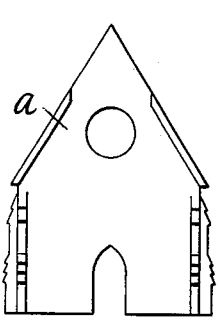
WITNESSES:
Albert C. Bell
Lottie Wood
INVENTOR:
John S. Littell
By W. H. Cowley
ATTY.

UNITED STATES PATENT OFFICE.

JOHN S. LITTELL, OF BROCKPORT, NEW YORK.

EDUCATIONAL APPLIANCE.

No. 898,754.     Specification of Letters Patent.     Patented Sept. 15, 1908.

Application filed March 16, 1906. Serial No. 306,357.

*To all whom it may concern:*

Be it known that I, JOHN S. LITTELL, a citizen of the United States, residing at Brockport, in the county of Monroe and State of New York, have invented a new and Improved Educational Appliance, of which the following is a specification.

My present invention relates to a model adapted to be used as an educational appliance, and comprises, broadly, a model divisible along such lines that, either the parts of the model thus divided or the natural order of assemblement of the several parts, or both the parts of the model and the natural order of their assemblement may be used in illustrating the fundamental features in the institution or thing for which the model stands or is in some way connected either as an expression or as an illustration of some of its features.

I have found that models of many edifices, such as temples of worship, etc., may be made and used in accordance with my invention. It will of course be understood, however, that the lines of division of the model may in some ways be varied according to the character of the edifice and of the fundamental features of the institution for which it stands and which it is desired to teach or illustrate thereby.

That embodiment of my invention herein shown and described comprising a model of a church made in sections and divisible along such lines that the several parts of the model illustrate different features of the institution which the church stands for or represents, and the lines of division are such also that in assembling the several parts in their natural order there may be illustrated many features of the history, doctrine, growth, etc. of the institution.

The accompanying drawings illustrating my invention are as follows: Figure 1 is a side elevation and Fig. 2 is a front elevation of a model of a church in accordance with my invention. Fig. 3 is the plan thereof with all parts above the foundation removed along the lines $t$—$t$ in Figs. 1 and 2. Figs. 4 and 5 show face and side views respectively of the transept $b$, seen in Fig. 1. Fig. 6 is a side view of the altar portion $d$ and Fig. 7 is the interior view of the same. Fig. 8 shows a rear view, Fig. 9 a side view and Fig. 10 a front view, of the nave or body portion of the church.

Referring to the drawings,—$h$ is the base piece representing the plot of ground devoted to the church use and services.

$e$ is the foundation of the church which may, preferably, be removably secured to the base piece $h$.

$m$—$m^1$ and $m^2$ are each a series of steps leading up to the level of the foundation of the model and from the base $h$. The steps $m$ are removable along the lines $x^1$—$x^1$—$x^2$ and $x^2$ of Fig. 3, and the steps $m^1$ are removable along the dotted lines $x^4$—$x^4$—$x^5$—$x^5$, and $x^6$—$x^6$ of Fig. 3. The steps $m^2$ are removable along lines similar to those already described in relation to the steps $m^1$.

$d$ is the altar portion separable from the nave portion along the lines $v$—$v$ of Figs. 1 and 3, and also separable from the foundation along the lines $t$—$t$ of Fig. 1.

$a$ is the nave of the church removable from the foundation along the lines $t$—$t$ of Figs. 1 and 2.

$b$ and $b^1$ are transepts separable from the nave in the following manner. The transept portion $b$ is separable from the nave $a$ along the lines $w$—$w$ of Fig. 3, and along the lines $w$—$w$ and $w^1$—$w^1$ of Fig. 2, and the transept $b^1$ is separable from the nave $a$ in the same way and along similar lines, and both these transepts are separable from the foundation along the lines $t$—$t$ of Figs. 1 and 2. The crosses $c^1$ are preferably separable from the nave and transept portions. The tower $g$ is separable from the foundation along the lines $t$—$t$ of Figs. 1 and 2 and from the nave along the lines $u$—$u$ indicated in Figs. 1 and 3. The spire portion $f$ is separable from the tower along the lines $s$—$s$ of Figs. 1 and 2. The foundation $e$ may be made if desired separable from the base piece $h$ along the lines $x$—$x$ of Figs. 1 and 2.

In using such a model in accordance with my invention the parts are assembled in the following order, viz:—The foundation $e$ is first located upon the base piece $h$,—next, the steps $m$—$m^1$ and $m^2$ are placed in position, then the altar section or apse $d$, and after that the nave $a$, and following that the transepts $b$ and $b^1$, and thereafter the tower $g$, and on top of that the spire section $f$, and then the cross $c$ is added to the spire $f$. The crosses $c^1$ may be inserted upon the nave and upon the transepts immediately after such nave and transepts have been placed in position.

I will now describe some of the uses of such a model of a church made in accordance with my invention.

A model such as herein shown and described may be used in teaching church doctrine, in which case, the plot of ground stands for a portion of the earth consecrated to the service of the Lord and illustrates also special opportunity to serve God. The cruciform foundation stands for the true and real foundation or help through sacrifice, and as aids in helping the world to mount and rest on this foundation, the several steps illustrate as follows: 1st step. The promises of Paradise. 2nd step. The life and labors of Abraham. 3rd step. The life and labors of Jacob. 4th step. Help through the law as given by Moses. 5th step. Help through prayer, priesthood and sacrifice, as illustrated in the life of Aaron. 6th step. Help through the royal line of kings, beginning with David. 7th step. Help through the work of the prophets from Isaiah down. All these lead up to the cruciform foundation or the sure foundation.

The altar section or apse is next erected, standing for the incarnation and the individual sacrifice. The nave, which is next put in place, stands for the fellowship or man in worship and looks towards the incarnation and individual sacrifice represented by the altar section. The transepts, which are next put in place, illustrate the outward extension of the church through missions actuated by brotherly love, and the cruciform section of the church with the nave and the transepts stand for the brotherly union of all mankind, as illustrated from the teachings of Christ. The windows in the church, when the church is lighted up, permit the light of the church and its noble work to emanate outwardly and be seen by the world. The base of the tower, which is next put in place, illustrates the resurrection, and the spire, which is then placed on the tower, stands for the ascension. The crosses stand for the culminating act in the Christ life, illustrating the heavenly and perpetual high priesthood.

Such a model of a church may also be used in teaching and illustrating the church calendar, in which case, the plot of ground, consecrated to the church use, stands for the days chosen and elected by association with Christ.

The steps leading up to the church foundation stand for the following calendar days: 1st step. Septuagesima and Sexagesima. 2nd step. Quinquagesima and Ash Wednesday. 3rd step. First and second Sundays in Lent. 4th step. Third and fourth Sundays in Lent. 5th step. Fifth Sunday in Lent and Palm Sunday. 6th step. The days in the Holy Week, Monday and Tuesday. 7th step. Wednesday and Thursday of the Holy Week. The cruciform foundation to which they lead up stands for Good Friday, the completed sacrifice and sure foundation. The altar section which is next placed stands for Christmas.

The steps leading up to the altar illustrate: 1st step. Annunciation. 2nd step. "Stir up" Sunday. 3rd step. First Sunday in Advent. 4th step. Second Sunday in Advent. 5th step. Third Sunday in Advent. 6th step. Fourth Sunday in Advent. 7th step. Advent ember season.

The altar section stands for Christmas. The nave stands for the ministering of the Holy Spirit and Pentecost. The transepts stand for All Saints' Day, and through the windows the light and influence of the fast and feast days reach out and extend to the world. The tower illustrates Easter, and the spire illustrates Ascension Day, and the cross thereon Trinity Sunday.

In the use of my invention for teaching church history, the plot of ground stands for the disclosure of God through Christ and the several steps stand for the heroes or martyrs who have led the world to Christ. The steps are as follows: 1st step. The twelve Apostles, and the two other Evangelists, Mark and Luke. 2nd step. St. Ignatius. 3rd step. St. Ireneus. 4th step. St. Ambrose. 5th step. St. Athanasius. 6th step. St. Augustine. 7th step. St. Chrysostom.

The cruciform foundation stands for the holy faith in the first days of the church and the altar stands for the place of the Holy Eucharist. The nave stands for the masses or multitudes of the unknown and unnamed saints and martyrs, who built up the main body of the church, and the transepts stand for the missionaries sent out by the church, like Ansgar, Boniface, Patrick, Augustine, Aidan and Martin. The transepts crossing with the main body of the church illustrate the union in the preaching and active force of the church as exemplified in the teachings of Jerome, Bernard, Hildebrand, Theodore of C., Bede and Eusebius. The windows let out the light of the early church teachings to the world. The tower stands for the modern missionaries, Xavier, Livingston, etc. The spire illustrates the loss in numbers of those who rise beyond the masses and approach more nearly the heavenly state, and the cross the completed life; the victory.

Such a model may be used also in the teaching of ethics, in which case the several parts illustrate the following points. The special plot of ground, devoted to the church service, illustrates the call of conscience to make the most of life and the cardinal virtues are illustrated in the several steps as follows: justice, temperance, prudence, fortitude, faith, hope and charity, in contradistinction to the vices which are overcome thereby, namely, envy, gluttony, lust, sloth, pride, covetousness and anger. The cruciform foundation stands for that unity of devotion and willing sacrifice of the character and life which gives fidelity. The altar stands for the specific sacrifice resulting from love for the higher life and a willingness to devote all thereto. The nave illustrates the brotherhood and the consequent tolerance and patience with others, and the transepts illustrate the outgoing interest in others and in the world at large, and the transepts crossing the nave illustrate the combined effect and influence of lives devoted in this way. The tower stands for progress upwards and it illustrates the strength of manhood, and the spire illustrates by its tapered formation a gradual breaking off of connections with the earth, and by its terminal cross, the victory through a life of devotion.

I desire to call attention to the following points, viz: My invention comprises, broadly, a model which is in some way connected with or illustrates features of an institution, such model divided into sections such that the different sections illustrate or stand for different features of such institution, and preferably also with lines of division between the parts of the model such that in the assembling of the parts, to make the completed model, in their natural order, the natural sequence of the different features of the institution may be also illustrated.

What I claim is:—

1. An educational appliance comprising a model of an edifice adapted to be used by an association or institution, divided into sections each illustrating a different feature of such institution.

2. An educational appliance comprising a model of an edifice adapted to be used by an association or institution, divided into sections each illustrating a different feature of such institution, the relations between the sections illustrating the relations between such features.

3. An educational appliance comprising a model of an edifice adapted to be used by an association or institution, divided into sections adapted in the natural order of their assemblement to illustrate the natural sequence of different features of such institution.

4. An educational appliance comprising a model of an edifice adapted to be used by an association or institution, divided into sections each illustrating a different feature of the institution, and adapted, in the natural order of their assemblement, to illustrate the natural sequence of such features.

JOHN S. LITTELL.

Witnesses:
ALBERT C. BELL,
LOTTIE WOOD.